US012712278B2

(12) United States Patent
Mitra et al.

(10) Patent No.: US 12,712,278 B2
(45) Date of Patent: Aug. 18, 2026

(54) MONOPOLE ANTENNA DESIGN FOR IMPROVED RF ANTENNA EFFICIENCY

(71) Applicant: TEXAS INSTRUMENTS INCORPORATED, Dallas, TX (US)

(72) Inventors: Biswadip Mitra, Fremont, CA (US); Xiaolin Lu, Plano, TX (US); Richard Wallace, Stockholm (SE); Kaichien Tsai, Allen, TX (US); Jianwei Zhou, Allen, TX (US); Cheick Kante, Prosper, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 131 days.

(21) Appl. No.: 17/888,447

(22) Filed: Aug. 15, 2022

(65) Prior Publication Data

US 2023/0050792 A1 Feb. 16, 2023

Related U.S. Application Data

(60) Provisional application No. 63/233,129, filed on Aug. 13, 2021.

(51) Int. Cl.
*H01Q 9/42* (2006.01)
*H01Q 1/22* (2006.01)

(52) U.S. Cl.
CPC ............. *H01Q 9/42* (2013.01); *H01Q 1/2225* (2013.01)

(58) Field of Classification Search
CPC ......... H01Q 1/2225; H01Q 1/243; H01Q 9/42
See application file for complete search history.

(56) References Cited

U.S. PATENT DOCUMENTS

| | | | | |
|---|---|---|---|---|
| 6,456,241 B1 * | 9/2002 | Rothe | H01Q 21/0081 343/770 |
| 9,799,964 B2 * | 10/2017 | Jang | H01Q 9/42 |
| 2004/0046699 A1 * | 3/2004 | Amano | H01Q 1/36 343/702 |
| 2007/0200777 A1 * | 8/2007 | Chen | H01Q 9/28 343/702 |
| 2008/0024371 A1 * | 1/2008 | Shih | H01Q 9/42 343/702 |
| 2009/0256771 A1 * | 10/2009 | Onaka | H01Q 9/42 343/700 MS |
| 2010/0194659 A1 * | 8/2010 | Chakam | H01Q 1/3241 343/866 |

(Continued)

*Primary Examiner* — Alexander H Taningco
(74) *Attorney, Agent, or Firm* — Xiaotun Qiu; Frank D. Cimino

(57) ABSTRACT

An electronic device includes a printed circuit board (PCB) with electronics configured to generate and receive data by a radio-frequency carrier signal via a signal terminal. A monopole antenna having first and second ends is connected to a signal terminal of the PCB at the first end. A first section of the antenna extends away from the signal terminal by a first length in a first direction. A second section of the antenna extends away from the first section by a second greater length in a second direction different from the first direction. The first section is spaced apart from the PCB by a third section of the antenna, and the second end of the antenna is spaced apart from the PCB by a dielectric spacer. The length of the antenna may be ¼ of a carrier frequency provided by the signal terminal.

15 Claims, 8 Drawing Sheets

(56) References Cited

U.S. PATENT DOCUMENTS

| | | | | |
|---|---|---|---|---|
| 2011/0068996 | A1* | 3/2011 | Flores-Cuadras | H01Q 1/38 29/601 |
| 2011/0175774 | A1* | 7/2011 | Su | H01Q 1/243 343/700 MS |
| 2012/0194390 | A1* | 8/2012 | Endo | H01Q 5/364 343/700 MS |
| 2012/0268332 | A1* | 10/2012 | Guan | H01Q 21/30 343/741 |
| 2012/0280871 | A1* | 11/2012 | Shamblin | H01Q 5/392 343/745 |
| 2017/0012353 | A1* | 1/2017 | Chen | H01Q 1/48 |
| 2019/0214733 | A1* | 7/2019 | Ban | H01Q 9/42 |
| 2020/0402711 | A1* | 12/2020 | Bhutani | H01Q 1/22 |

* cited by examiner

MONOPOLE ANTENNA DESIGN FOR IMPROVED RF ANTENNA EFFICIENCY

CROSS-REFERENCE TO RELATED APPLICATIONS

This application claims priority to U.S. Provisional Patent Application Ser. No. 63/233,129, filed on Aug. 13, 2021, which is incorporated herein by reference in its entirety.

FIELD

This disclosure relates to the field of electronic devices, and more particularly, but not exclusively, to such devices that communicate by radio-frequency carrier waves.

BACKGROUND

Some manufacturing facilities use local radio-frequency (RF) devices that travel with work-in-progress (WIP) for tracking, inventory and/or scheduling purposes. Such devices may be small, and have a relatively short transmission and/or reception range, which may be disadvantageous in some contexts.

SUMMARY

The inventors disclose various devices and/or methods that may be beneficially applied to RF devices, or tags, that travel with WIP in a manufacturing facility. While such implementations may be expected to provide improvements, e.g. increased range of communication between a WIP tag and other tags or a centralized controller, no particular result is a requirement of the described invention(s) unless explicitly recited in a particular claim.

One example provides a monopole antenna including an antenna element having an axis and a cylindrical cross-sectional profile. A first section of the antenna element extends parallel to a first axis of a rectilinear coordinate space. A second section of the antenna element extends from the first section parallel to a different second axis of the rectilinear coordinate space. A third section of the antenna element extends from the second section parallel to the first axis by first distance. A fourth section of the antenna element extends from the third section parallel to a different third axis by second distance greater than the first distance.

In another example, an electronic device includes a printed circuit board (PCB) having electronics thereon configured to generate and receive data by a radio-frequency carrier signal via a signal terminal. A wire having first and second ends is attached to the signal terminal via the first end. The wire includes a first section extending away from the signal terminal by a first length in a first direction. The wire further includes a second section extending away from the first section by a second greater length in a second direction different from the first direction. The first and second sections are spaced apart from the PCB by a third section of the wire.

Yet another example provides a method of forming an electronic device. The method includes forming a first bend in a wire having first and second ends. A first section of the wire is between the first end and the first bend and extends in a first direction. A second bend in the wire is spaced apart from the first bend, a second section of the wire being located between the first and second bends and extending in the first direction. A third bend in the wire is spaced apart from the second bend, and a third section of the wire is located between the third bend and the second end and extends in a second direction orthogonal to the first direction, the third section having a length at least twice a length of the second section. The first section of the wire is conductively connected to a signal electrode on a printed circuit board (PCB), the signal electrode being configured to drive the wire with a signal having a carrier frequency of about 2.45 GHz. The second end of the wire is spaced apart from the PCB by a dielectric spacer.

DETAILED DESCRIPTION

The present disclosure is described with reference to the attached figures. The figures may not be drawn to scale and they are provided merely to illustrate the disclosure. Several aspects of the disclosure are described below with reference to example applications for illustration, in which like features correspond to like reference numbers. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events may be required to implement a methodology in accordance with the present disclosure.

WIP tags may be used in various manufacturing contexts to assist in tracking material movement. Some manufacturing settings, e.g. semiconductor fabrication facilities, or "fabs", can occupy a large area, which may present a challenging environment for WIP tags to communicate with each other and/or a central server. Thus it is desirable that an antenna for such devices provide adequate gain. Furthermore, since the location of a particular WIP tag may be arbitrary with respect to other devices with which the WIP tag may communicate, it is desirable that the antenna gain be as omnidirectional as possible.

The following description provides examples of an antenna that may be used for a WIP tag, the antenna providing an advantageous gain pattern that may allow multiple such WIP tags to effectively communicate in a manufacturing environment such as a semiconductor fab. Such example antennas may provide longer range and/or more uniform gain relative to off-the-shelf antennas, thereby allowing, e.g. fewer WIP tag server nodes to be used in the manufacturing setting.

Figure 1:
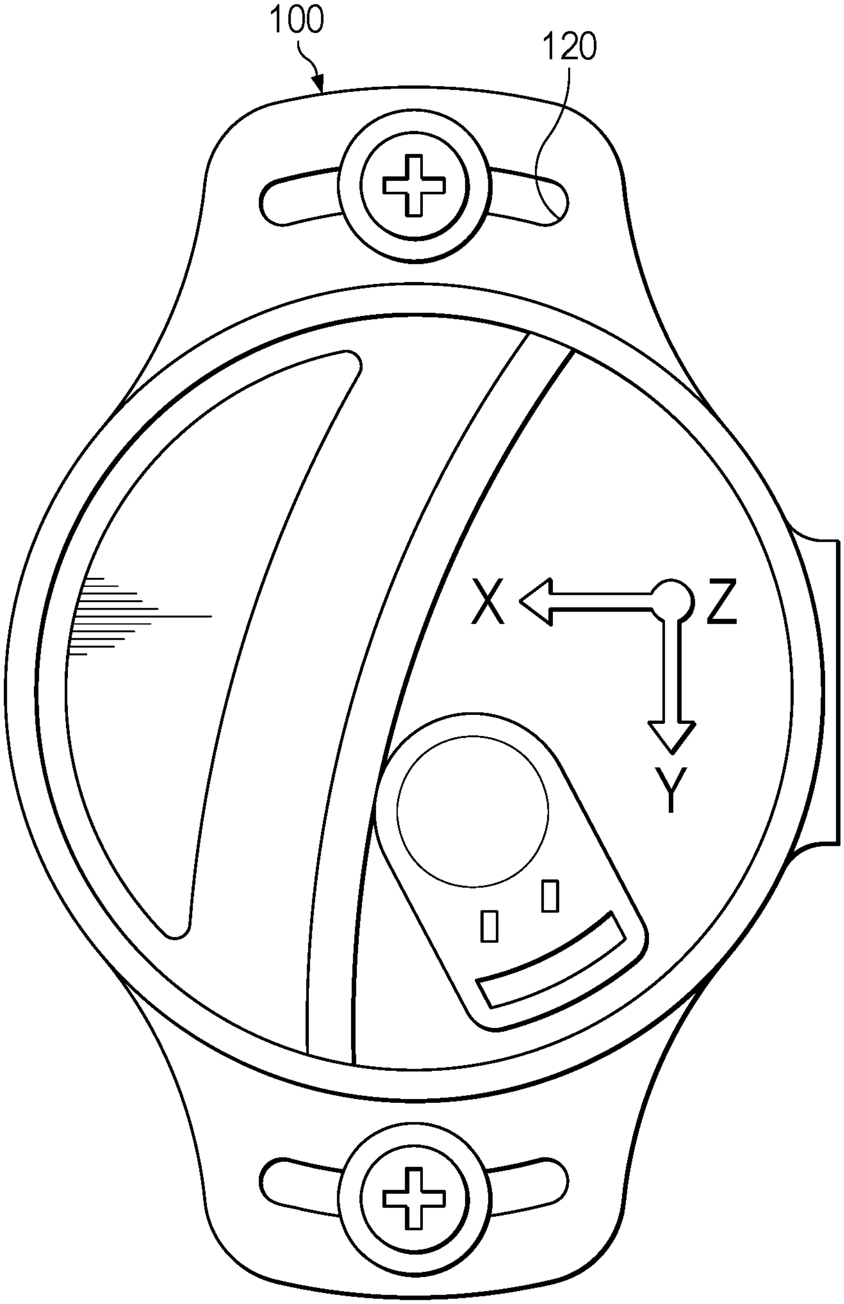
FIG. 1 schematically illustrates a work-in-progress (WIP) tag according to an example of the disclosure.
Figure 2:
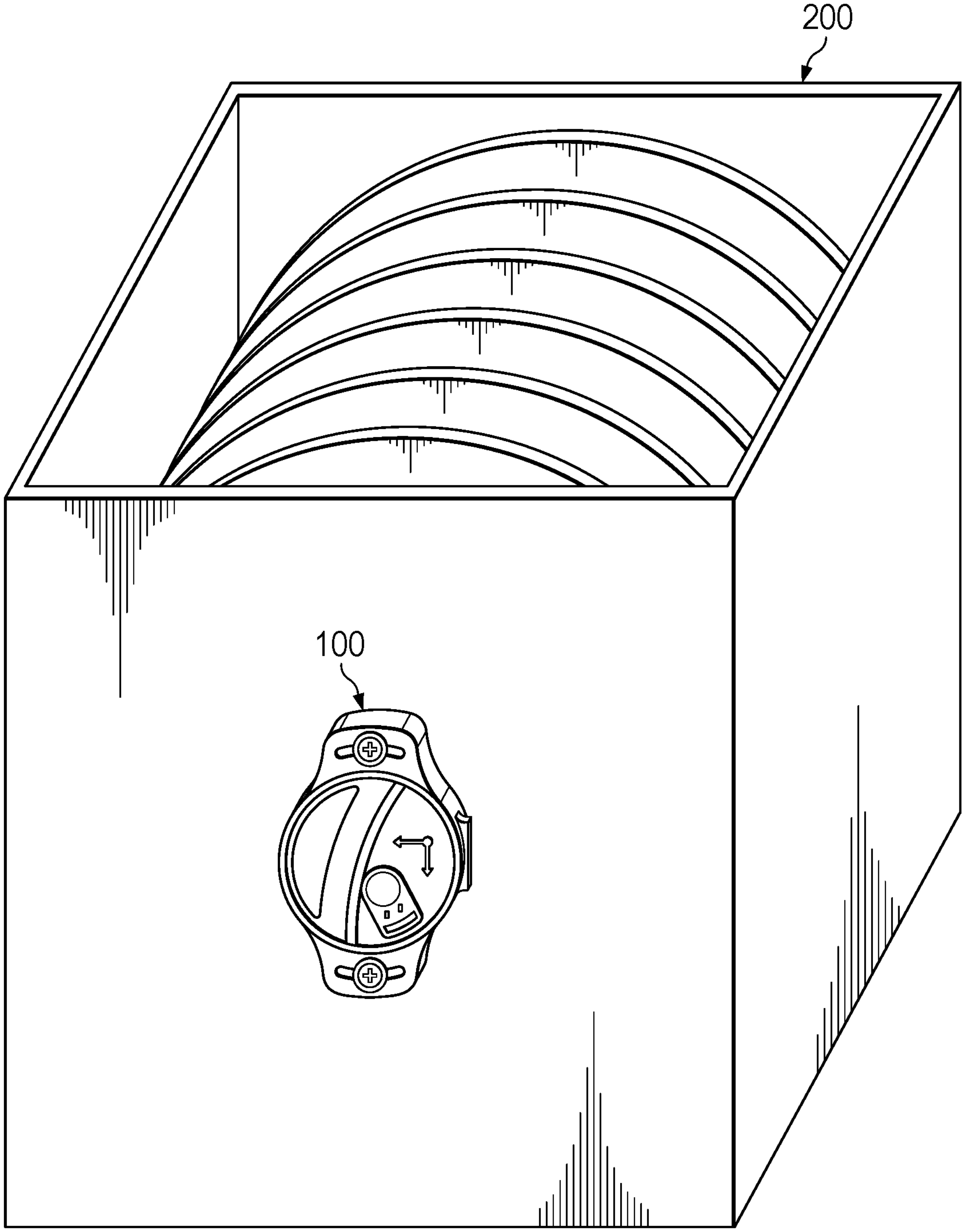
FIG. 2 shows an illustrative placement of a WIP tag with respect to a material carrier (e.g. a semiconductor wafer boat or FOUP.

FIG. 1 shows an example of a WIP tag 100. The WIP tag 100 may have a relatively small profile, e.g. having a diameter of about one inch (25 mm) and a thickness of about one-half inch (10 mm). The WIP tag 100 includes a housing 110, which in the illustrated example includes slots 120 that may be used to mount the WIP tag to a manufacturing unit such as a wafer carrier or "boat", or FOUP (Front Opening Unified Pod or Front Opening Universal Pod), carrying a number of semiconductor wafers in a fabrication facility. FIG. 2 illustrates an example semiconductor substrate or wafer carrier 200 on which the WIP tag 100 is attached.

Figure 3A:
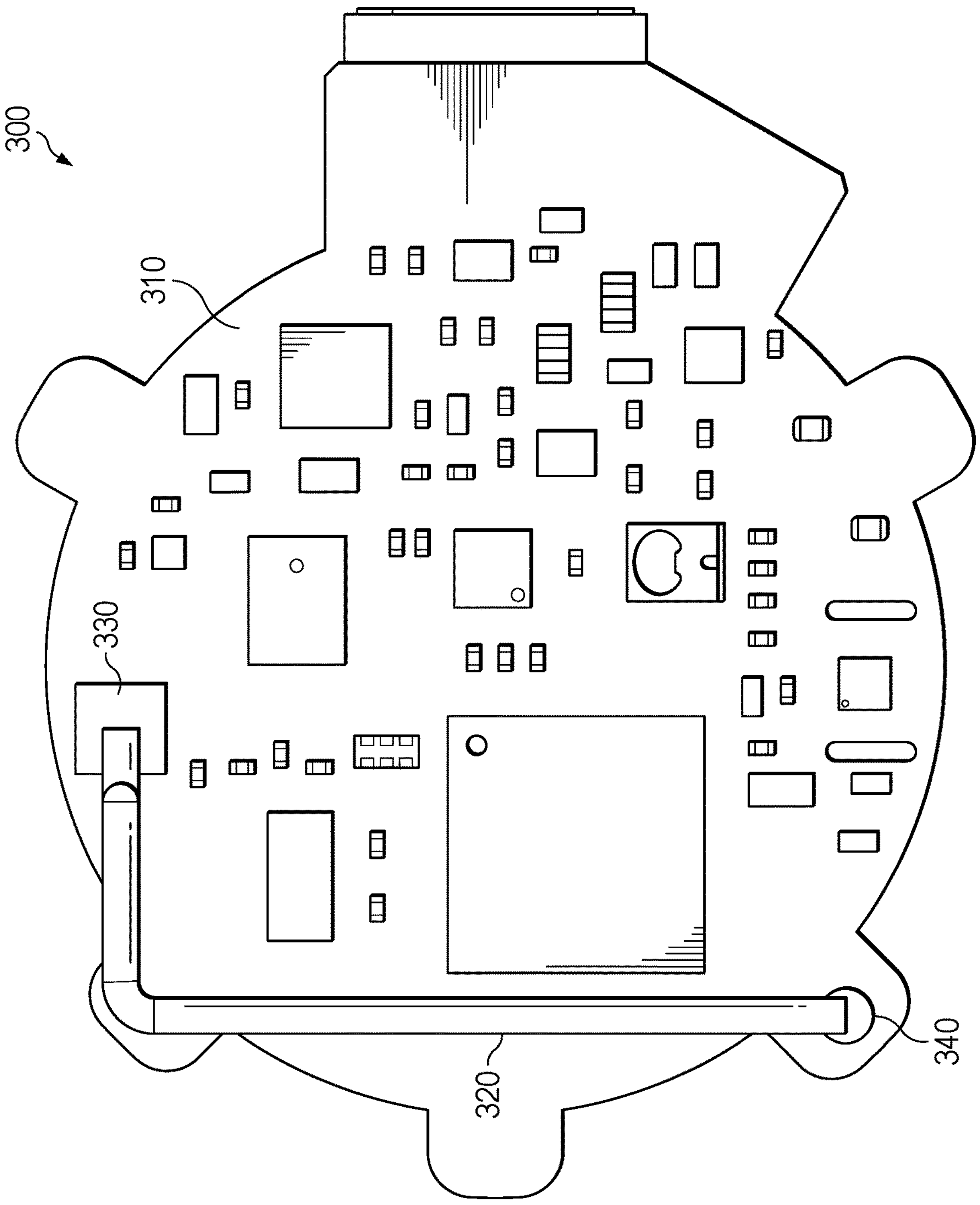
FIGS. 3A and 3B show a printed circuit board (PCB) and an antenna, e.g. a monopole antenna, that may be contained by the WIP tag of FIG. 1.
Figure 3B:
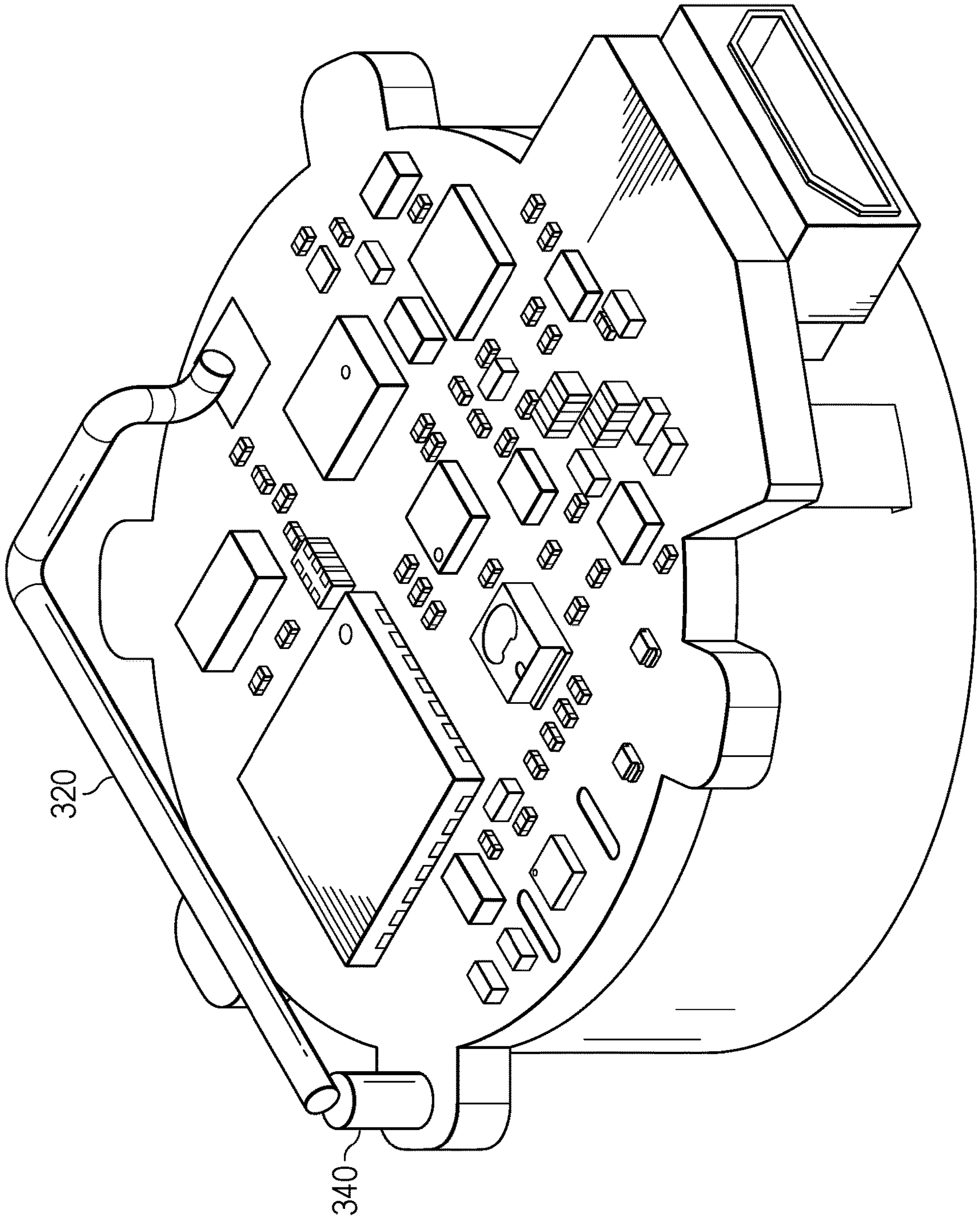
Figure 4A:
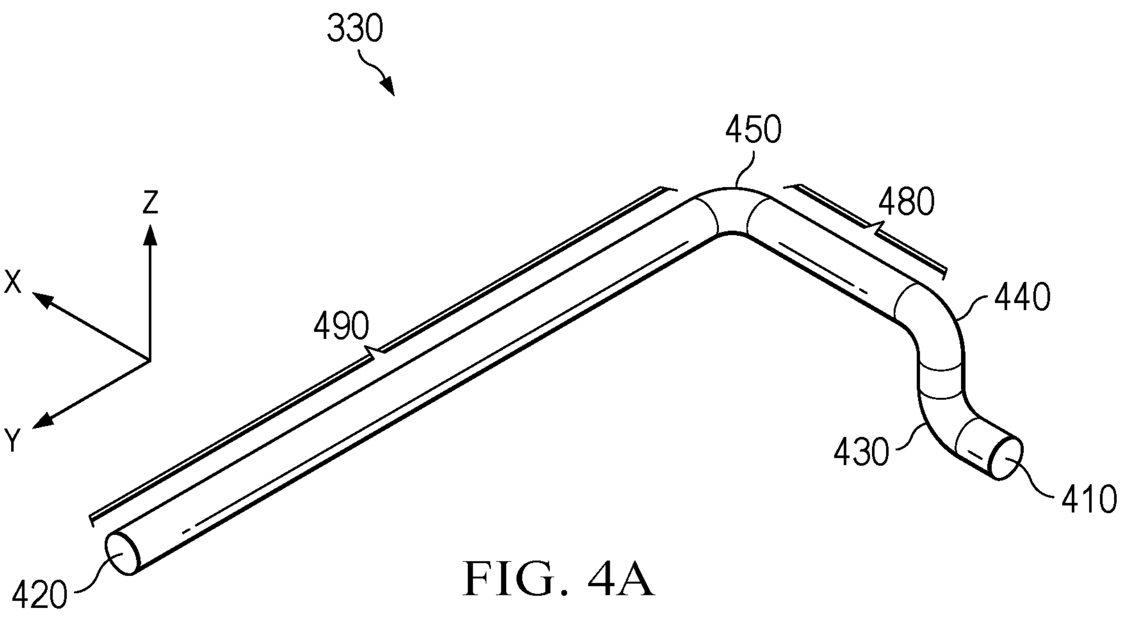
FIGS. 4A through 4D illustrate aspects of the antenna of FIGS. 3A and 3B.
Figure 4B:
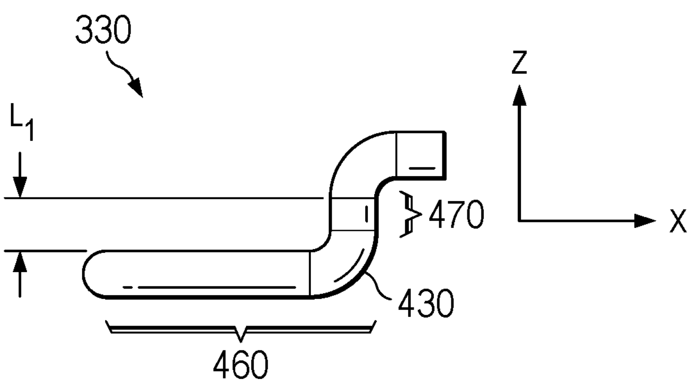
Figure 4C:
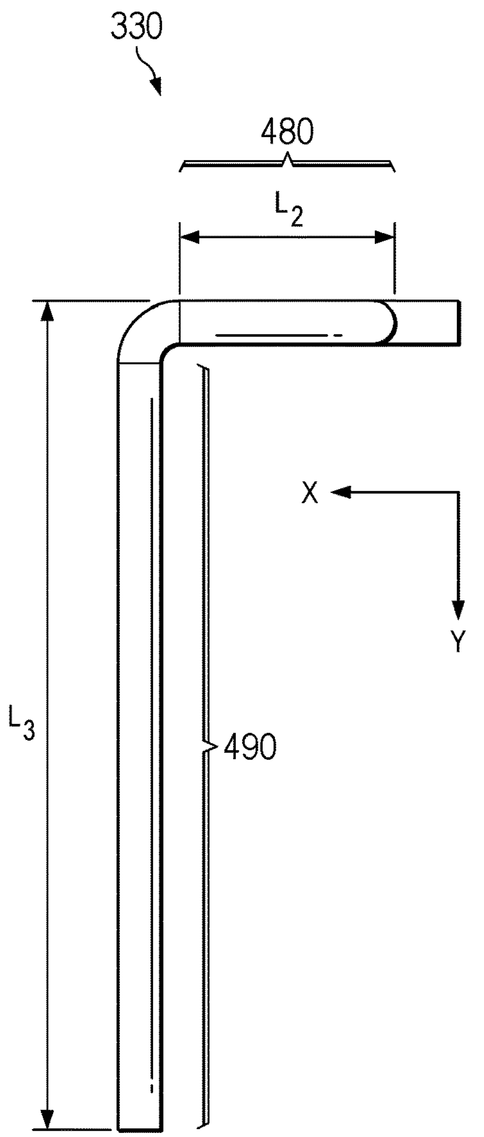
Figure 4D:
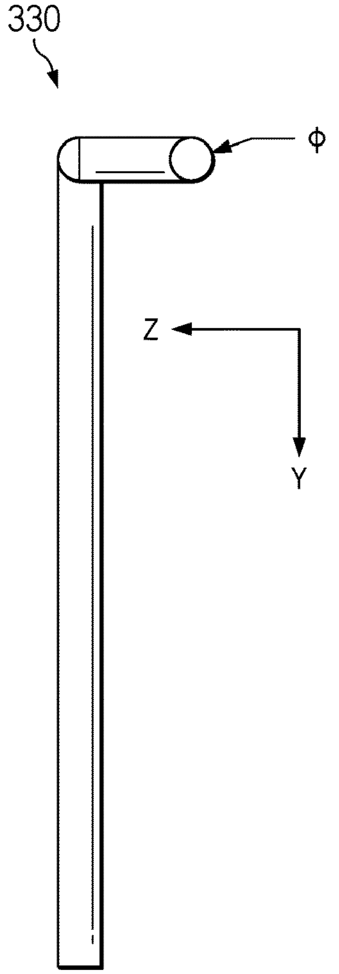

FIGS. 3A and 3B illustrate an example electronic device 300 in plan view (FIG. 3A) and perspective view (FIG. 3B). The device 300 includes a printed circuit board (PCB) 310 on which various electronic components are mounted. The device 300 also includes an antenna 320 according to various examples described herein. The antenna 320 is connected to a signal terminal 330. The device 300 may direct a radio-frequency (RF) signal to the terminal 330 to be radiated by the antenna 320, and may receive and demodulate RF signals received by the antenna 320. The antenna 320 is conductively connected only at the terminal 330, and may thus be regarded as a monopole antenna. The antenna 320 is supported, or spaced apart from the PCB 310, by a dielectric spacer 340, or bushing. While not limited to any particular dielectric material, the spacer 340 may be implemented by a ceramic, or a polymer, e.g. PTFE (polytetrafluoroethylene) which has a dielectric permittivity of about 2. The antenna 320 is configured to fit within a small package, e.g. about one inch or less, while providing omni-directional gain.

FIGS. 4A-4D illustrate the antenna 320 in further detail, and are referred to concurrently. Coordinate XYZ axes of a rectilinear space are shown for reference. The antenna 320 has a first end 410 and a second end 420, and includes a first bend 430, a second bend 440 and a third bend 450. A first section 460 extends parallel to the X-axis between the first end 410 and the first bend 430. The length of the first section 460 is not limited to any particular value, and is sufficient to provide attachment to the signal terminal 330, e.g. by solder. A second section 470 extends parallel to the Z-axis between the first bend 430 and a second bend 440. A third section 480 extends parallel to the X-axis between the second bend 440 and a third bend 450, and a fourth section 490 extends parallel to the Y-axis between the third bend 450 and the second end 420.

The second section 470 spaces the third section 480 and the fourth section 490 away from the PCB 310. A length $L_1$ of the second section 470 is not limited to any particular value, and may be on the order of a diameter Ø (FIG. 4D) of a wire or rod from which the antenna 320 is formed, e.g. about 1 mm, or sufficient to space the antenna 320 apart from the PCB 310. Similarly a length $L_2$ of the third section 480 is not limited to any particular value, and may be selected to avoid mechanical interference between the antenna 320 and components mounted on the PCB 310. In the example shown $L_2$ is about 40% of a length $L_3$ of the fourth section 490.

The total length of the antenna 320, e.g. $L_1+L_2+L_3$, as well as the incremental length of the bends 440 and 450, may be determined as one-fourth of a desired radiating or carrier frequency of the antenna, or the signal provided by the terminal 330. Thus the antenna 320 may be a ¼ λ antenna. In some examples the radiating frequency may be selected to be about 2.54 GHz. In such examples, the total length of the antenna 320 after the terminal 330 may be about 29.5 mm. In some such examples $L_1 \approx 1$ mm, $L_2 \approx 8$ mm, and $L_3 \approx 20$ mm. Of course, the sections 470, 480 and 490 may have other lengths, and the total length may be determined based on a different radiating frequency.

The antenna 320 may be formed from any suitable conductive material. In various examples the antenna 320 is metallic, and may include or be primarily composed of copper. In some examples the antenna 320 is solder-compatible such that the antenna 320 may be soldered to the terminal 330. In some examples the antenna 320 may be coated with a material to prevent or reduce corrosion or oxidation.

Figure 5:
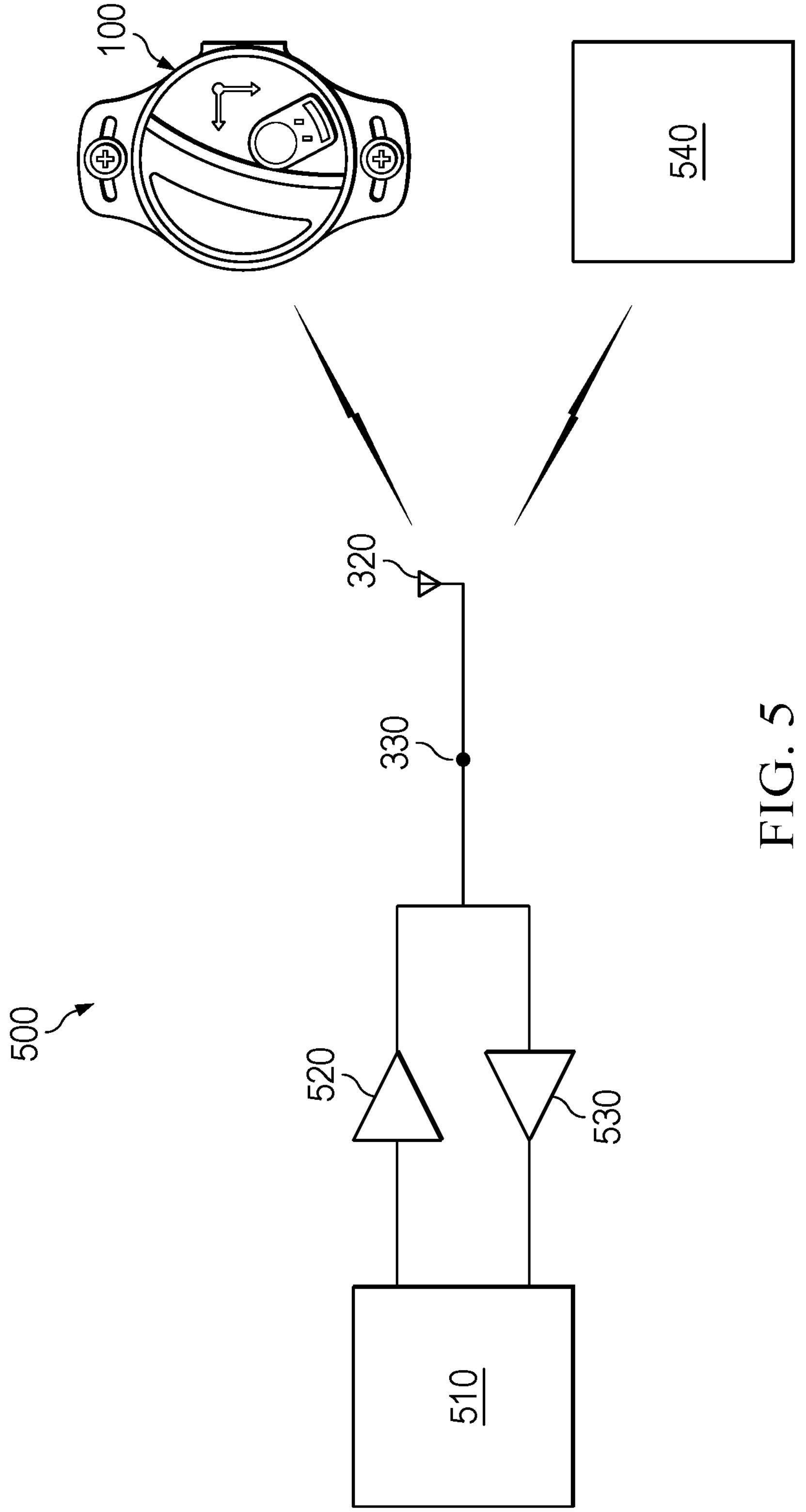
FIG. 5 is a schematic representation of the WIP tag of FIG. 1, including an antenna such as that shown in FIGS. 4A-4D.

FIG. 5 illustrates a schematic view of a system 500, e.g. as implemented in the WIP tag 100, that employs the antenna 320. The system 500 includes a circuit 510 that implements various functions such as data handling, carrier generation modulation, and demodulation. A first directional amplifier 520 may provide the modulated carrier signal to the antenna 320 via the terminal 330. Similarly, the antenna 320 may provide a received RF signal to a second direction amplifier 530 via the terminal 330. Thus the WIP tag 100 may communicate bidirectionally with other instances of the WIP tag 100 (peer-to-peer) and/or server nodes 540 located within the manufacturing facility. In some examples one or more instances of the system 500 may operate to bridge communications between the WIP tag 100 and the server node 540.

Implementations of the antenna 320 consistent with described examples provide improvement of range and/or gain uniformity relative to some conventional examples. For example, one development iteration of a WIP tag was implemented using a commercially-available surface-mount antenna. This conventional antenna resulted in an efficiency of only about 11% at 2.54 GHz, and a highly non-uniform, directional, gain ranging from 0.01 to 0.05.

Figure 6:
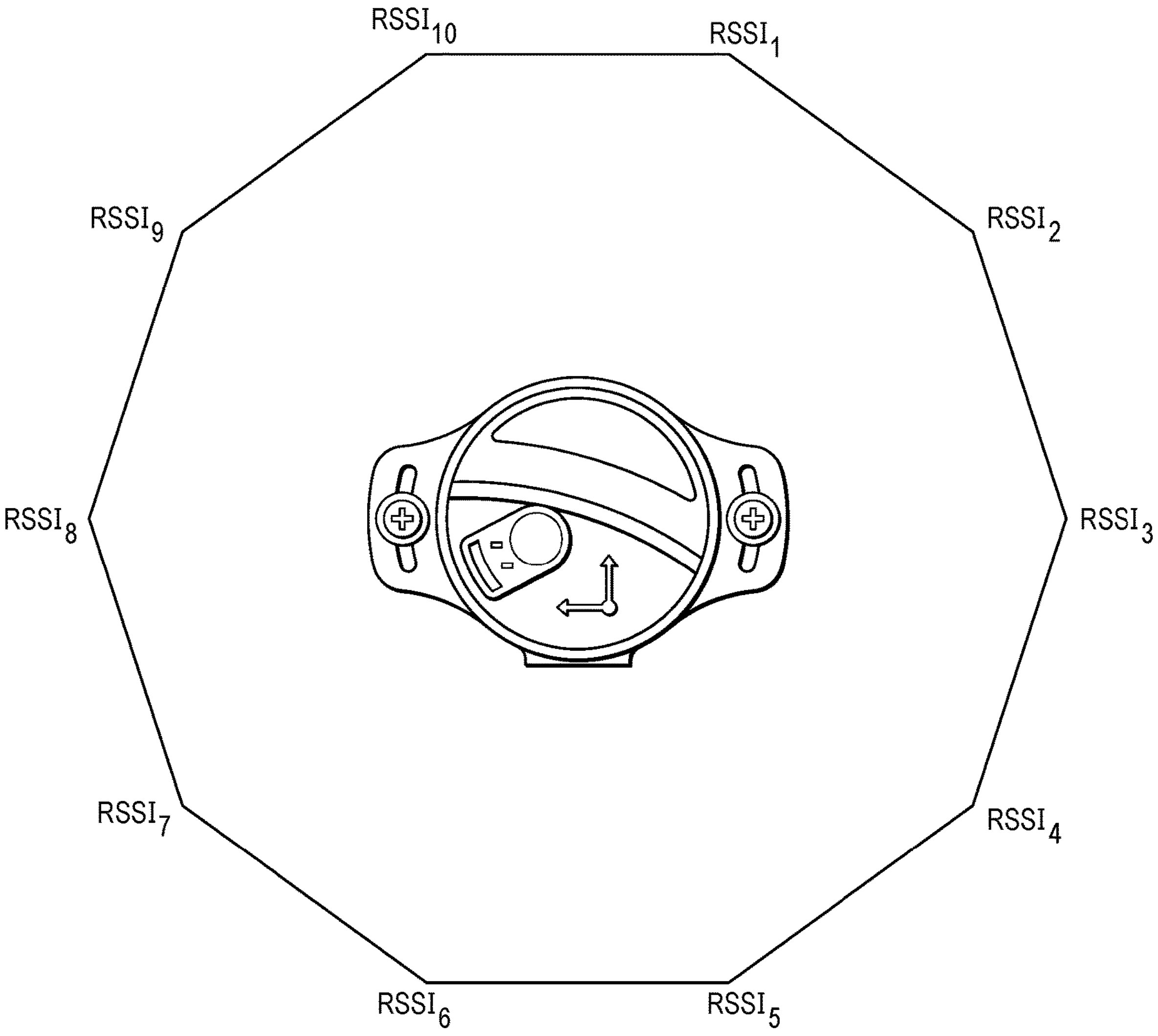
FIG. 6 illustrates an RSSI (received signal strength indication) pattern for an example of the WIP tag of FIG. 1 including the antenna of FIGS. 4A-4D.

In marked contrast, the WIP tag 100 implemented with the antenna 320 according to described examples resulted in an RSSI (received signal strength indication) as shown in FIG. 6. In this figure, the RSSI was determined at ten uniformly distributed azimuths, shown as $RSSI_1$ . . . $RSSI_{10}$. In one example, the RSSI values ranged from −62 dBm to −72 dBm. Furthermore the communication range of the WIP tag 100 was determined to be 50-60 m, with second-order harmonics about 50 dB below a transmit power of about 2 dBm. These characteristics provide robust communication in a manufacturing setting with high immunity to orientation effects.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. An antenna, comprising:

an antenna element having first and second ends;

a first section of the antenna element extending from the first end to a first bend, the first section including the first end;

a second section of the antenna element extending from the first bend to a second bend;

a third section of the antenna element extending from the second bend to a third bend parallel to the first section; and a fourth section of the antenna element extending from the third bend to the second end, wherein the fourth section is bendless and is perpendicular to the second section.

2. The antenna of claim 1, wherein the antenna element comprises a copper rod.

3. The antenna of claim 1, wherein the third section has a first length and the fourth section has a second length and wherein the second length is at least twice the first length.

4. The antenna of claim 3, wherein the second section has a third length less than half the first length.

5. The antenna of claim 4, wherein the antenna element is formed from a metallic rod, and the third length is about a diameter of the metallic rod.

6. The antenna of claim 3, wherein the second length is about 20 mm.

7. The antenna of claim 1, wherein the antenna element is driven with a signal having a frequency in a range from 2.40 GHz to 2.48 GHz.

8. The antenna of claim 1, wherein the second, third, and fourth sections have a total length of about 29 mm.

9. The antenna of claim 8, wherein the second section has a length of about 1 mm, the third section has a length of about 8 mm, and the fourth section has a length of about 20 mm.

10. The antenna of claim 1, wherein the antenna element is coupled to a printed circuit board (PCB) by solder, and the fourth section is spaced apart from the PCB.

11. The antenna of claim 10, wherein the fourth section is spaced apart from the PCB by a spacer.

12. The antenna of claim 11, wherein the spacer comprises dielectric material.

13. A system, comprising:

a first circuit;

an amplifier coupled to the first circuit; and an antenna coupled to the amplifier, wherein the antenna comprises an antenna element having first and second ends, a first section of the antenna element extending from the first end to a first bend, the first section including the first end, a second section of the antenna element extending from the first bend to a second bend, a third section of the antenna element extending from the second bend to a third bend parallel to the first section, and a fourth section of the antenna element extending from the third bend to the second end, wherein the fourth section is bendless and is perpendicular to the second section.

14. The system of claim 13, wherein the third section has a first length and the fourth section has a second length and wherein the second length is at least twice the first length.

15. The system of claim 14, wherein the second section has a third length less than half the first length.

* * * * *